UNITED STATES PATENT OFFICE.

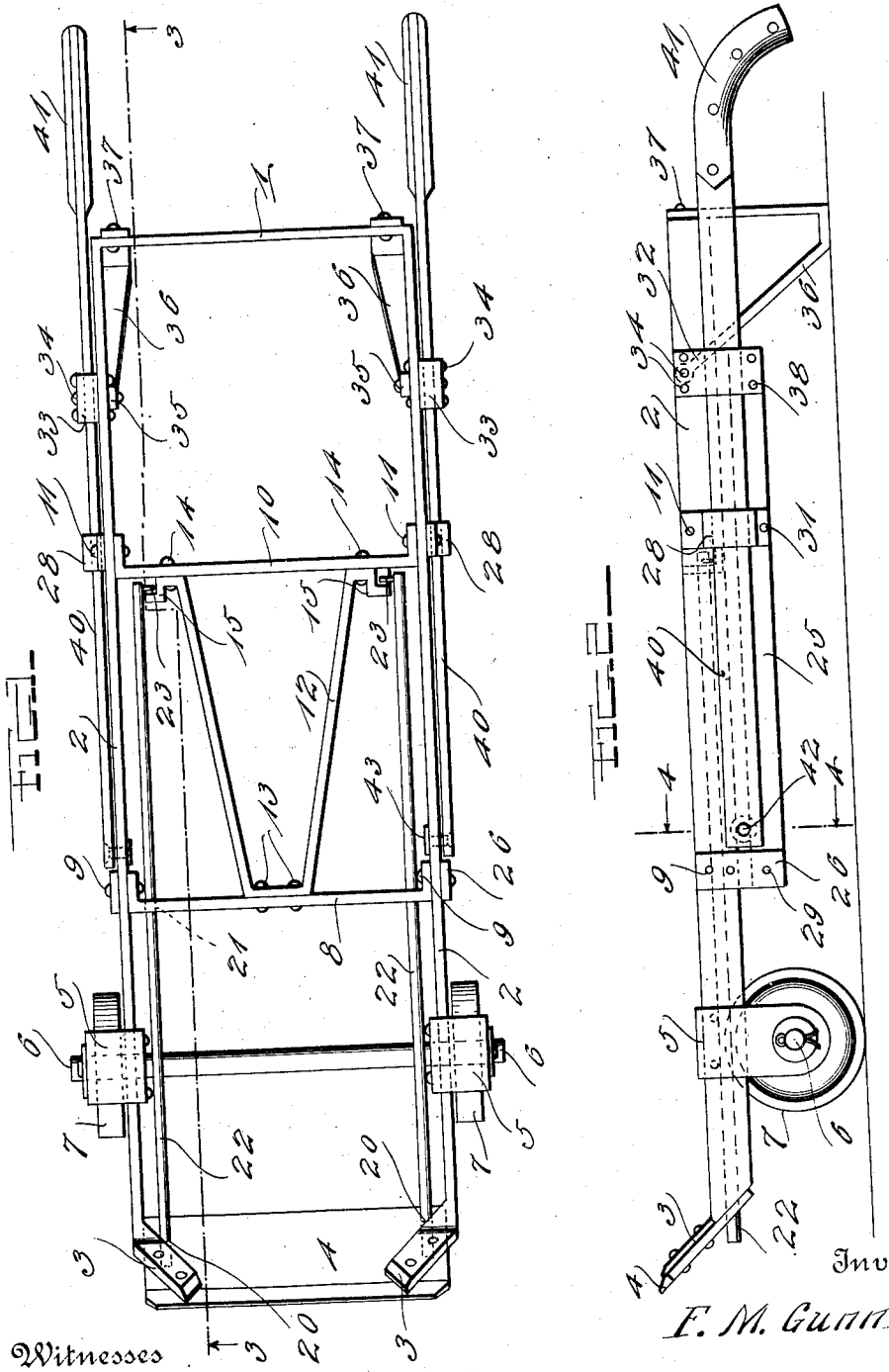

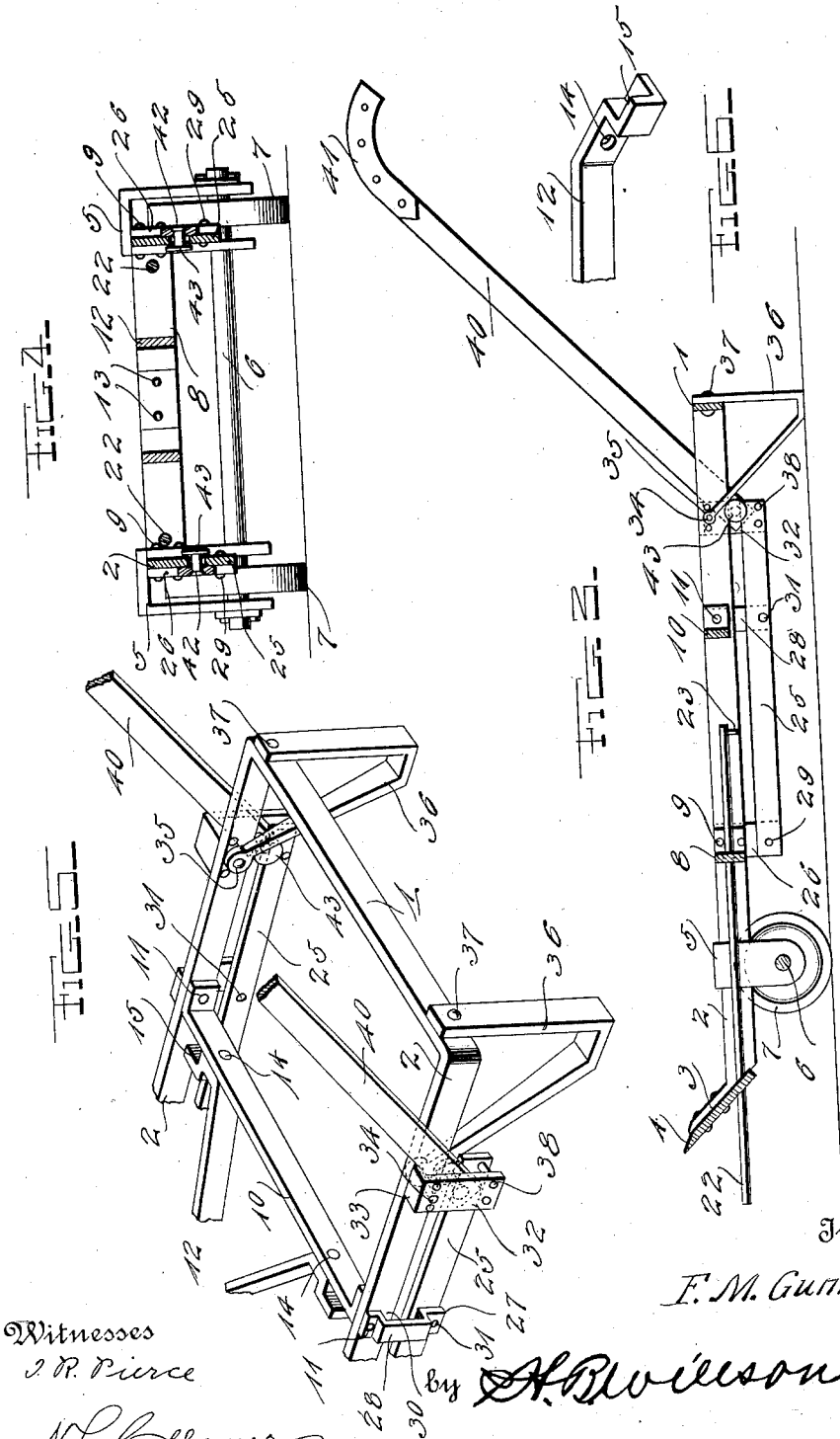

FRANK MURRAY GUNN, OF BAKERSFIELD, CALIFORNIA.

HAND-TRUCK.

1,043,694.   Specification of Letters Patent.   Patented Nov. 5, 1912.

Application filed January 4, 1912. Serial No. 669,419.

*To all whom it may concern:*

Be it known that I, FRANK MURRAY GUNN, a citizen of the United States, residing at Bakersfield, in the county of Kern and State of California, have invented certain new and useful Improvements in Hand-Trucks; and I do declare the following to be a full, clear, and exact description of the invention, such as will enable others skilled in the art to which it appertains to make and use the same.

This invention relates to the class of carriages and wagons, and more especially to trucks such as are employed for transporting freight of small size by hand; and the object of the same is to produce a truck of this character having two pairs of handles, both of which may be extended and one of which may be canted upward so that a small piece of freight, such as a trunk or the like, may be carried up and down stairs. This and other objects are accomplished by the construction hereinafter more fully described and claimed and as shown in the drawings wherein—

Figure 1 is a plan view and Fig. 2 a side elevation of this improved truck complete. Fig. 3 is a longitudinal section on the line 3—3 of Fig. 1, taken on a somewhat smaller scale, and Fig. 4 is a cross section on the line 4—4 of Fig. 2. Fig. 5 is a perspective detail of the rear end of the truck with the handles canted upward, and Fig. 6 is a perspective detail which will be referred to hereinafter.

In the drawings the body frame of this truck is shown as composed of a piece of strap metal bent into substantially U-shape with its center 1 extending across the back of the truck and forming the rear end thereof, and its two legs 2 standing parallel and forming the sides thereof, their front ends 3 being turned inward and upward and riveted to the foot 4 which stands oblique as usual. Over the sides of this frame near its front end are riveted U-shaped yokes 5 through whose lower ends is passed the axle 6 carrying the wheels 7. The body structure further comprises a front brace consisting of a cross piece of strap iron 8 having its extremities deflected and riveted as at 9 to the side bars 2, a rear brace 10 similarly riveted as at 11, and an oblique or V-shaped brace 12 whose angle is riveted as at 13 to the front brace 8 and whose arms diverge and are deflected outward and riveted as at 14 to the rear brace 10, beyond which rivets they are formed into lips 15 as best seen in Fig. 6 for a purpose to appear below. Thus is built up an all-metal frame of the desired dimensions, with the strap iron of which it is composed selected from stock having a weight proportionate to the size of the device and the uses to which it is to be put; and, although I do not limit myself to the details of construction thus far described, a frame of this character is cheap, light and strong and easily adapted to the specific features of my invention which will now be set forth.

Through a hole 20 in the foot 4 and another hole 21 in the cross brace 8 and at points near each side bar 2 is loosely passed a round steel rod 22 whose length is sufficient (as shown in Fig. 1) to permit it to extend backward opposite the lip 15 and into contact with the rear cross bar 10; and the rear end of this rod carries a pin 23 projecting radially from it and adapted by proper rotation of the rod in the holes 20 and 21 to be thrown into engagement with the lip as shown in this view. There are two such rods, and when it is desired to lift the front end of the truck they are rotated slightly in their place to disengage their pins 23 from the lips 15, and drawn longitudinally forward to or beyond the position indicated in Fig. 3; but obviously the pins cannot pass through the holes 21 and the rods cannot be entirely withdrawn. Their front ends when so drawn forward serve as a pair of handles by means of which an operator can lift the front end of this truck off the floor.

The handles at the rear end of the truck are duplicates of each other, and I will describe but one. To support it a guide bar 25 of strap iron is suspended beneath the side bar 2 of the frame and in spaced relation thereto by means of three upright straps of special construction for a purpose to appear below. The front strap 26 has a straight body riveted against the outer faces of the side bar by the rivet 9 which attaches the cross bar 8 and secured against the outer face of the guide bar 25 by a rivet 29, as best seen in Figs. 1 and 2. The other two straps are best illustrated in Fig. 5. The next one to the rear has its extremities mounted respectively on the rivet 11 which attaches the rear cross bar 10 to the side bar 2 and on a rivet 31 through the guide bar 25, and between these extremities its center 28 is deflected outward to produce a loop 30 which is of somewhat greater upright dimensions than the space between the side bar 2 and the guide bar 25, for a purpose to appear below. The third strap has an L-shaped body whose shank 32 stands upright opposite and is spaced from the side bar 2 and guide bar 25 and whose foot 33 is drawn into contact with said side bar 2 by rivets or bolts 34, one of which passes through an eye 35 at the upper inner end of a leg member 36, the other end thereof being secured as at 37 to the rear bar of the frame in any suitable manner. The lower end of said shank is riveted or bolted to the guide bar 25 as at 38, and for a reason which will appear below this strap is thereby more securely fastened in place than either of the others.

Each rear handle consists of a straight body 40 of strap iron which is wider than the space between the side bar 2 and guide bar 25 and of proper dimensions to fit slidably within the loop 30, a downturned handhold 41 at its rear end, and a rivet 42 through its front end with its shank extending inward loosely through the space between the side bar and guide bar, and its inner end provided with a large head 43. The body thus moves freely through the loop 30, while the rivet travels in what might be called the "runway" between said bars 2 and 25. When this handle is moved inward to its housed or usual position as seen in Figs. 1 and 2, its front end abuts against the strap 26 and its hand-holds stand in the usual position with relation to the body so that the truck can be moved about on its wheels 7; but when the handle is drawn to the rear, its body slides through and finally entirely out of the loop, while its rivet travels along said runway and eventually through and past the intermediate strap and under the rear cross bar 10 until its head 43 strikes the leg 36 below the eye 35 thereof as perhaps best seen at the right of Fig. 5. At this time the entire handle has some considerable vertical play (as its body has passed out of the loop 30) and it may therefore be canted upward as shown in this view until its upper edge strikes under the rear corner of the foot 33 of the rearmost strap and also against the rearmost bolt 34 which holds the upper end of said strap to the side bar 2. It will now be seen why this strap is so securely riveted in place. The distance between the point where the upper edge of the handle body bears under said foot and bolt and the lower side of its rivet bears downward on the guide bar 25, is quite short in proportion to the length of the handle; and when a piece of freight such as a trunk or the like is put upon the body of the truck and the latter is lifted, the weight of the freight must be resisted so firmly that the parts will not be sprung.

In using this device for the purpose of carrying trunks and other baggage up and down stairs, the front handles are drawn out in the manner described above and the rear handles are drawn out and canted upward as seen in Fig. 3, and one operator takes hold of each pair so that the truck body stands substantially level and the trunks thereon will not slip off. When the truck is to be used for carrying baggage or other freight on a level, the rear handles are not drawn out so far, if at all. When the truck is to be used as usual, the front handles are housed and their pins engaged with the lips 15 as seen in Fig. 1, and the operator grasps the hand-holds 41 and moves the truck on its wheels 7 in a manner well understood. Thus it will be seen that my improved truck possesses possibilities of use in a variety of circumstances, attained without the sacrifice of strength and without unnecessary complication or weight of parts. Nevertheless I do not confine myself to the strict details of construction hereinbefore described, as the gist of this invention is set forth in the following claims, to wit:

1. In a truck, the combination with a frame having pairs of non-alined guides in its front and rear portions; of a pair of rods slidably mounted in the front guides and extensible beyond the front end of the frame, a pair of handles slidably mounted in the rear guides and having hand-holds at their rear extremities projecting beyond the rear of the frame when the handles are housed in said guides, and stops on said handles abutting against the leg when the handles are drawn out and canted upward, for the purpose set forth.

2. In a truck, the combination with a frame including a cross bar having holes through it near the sides of the frame and a foot at the front end of the latter having holes alined with those in the cross bar; of a pair of round rods each slidably mounted in one set of alined holes and having a pin projecting laterally from its rear end, and a lip carried by the frame with which said pin engages when each rod is housed within the frame and rotated in the proper direction.

3. In a truck, the combination with a frame including a cross bar having holes through it near the sides of the frame and a foot at the front end of the latter having holes alined with those in the cross bar; of a pair of round rods each slidably mounted in one set of alined holes and having a pin projecting laterally from its rear end, a second cross bar within the frame, and a V-shaped brace connected at its angle with the first-named cross bar and having its arms connected with the last-named cross bar and deflected thence outward into lips adapted to receive said pins on the rods when the latter are housed and rotated in the proper direction.

4. In a truck, the combination with a substantially rectangular body of strap iron, two spaced cross bars of strap iron within said frame and having their extremities deflected and riveted to it, one of them being provided with holes near its extremities and an end member of the frame having other holes in alinement therewith, and lips carried by the other of said cross bars out of alinement with said holes; of a pair of round rods, each sliding through an alined pair of said holes and adapted to be housed within the frame when the inner end contacts with the non-perforated cross bar, and a pin projecting radially from said end and adapted to be engaged with one lip when the rod is turned in the proper direction.

5. In a truck, the combination with a frame composed of strap iron, a guide bar disposed beneath each side bar of the frame and leaving a runway between them, and means for holding said bars rigidly in relative position; of a handle comprising a straight body of strap iron and a downturned hand-hold at its rear end, and a rivet through its front end whose shank slides in said runway and whose inner end has an enlarged head sliding inside said bars while the body of the handle slides outside of them.

6. In a truck, the combination with a frame composed of strap iron, a guide bar disposed beneath each side bar of the frame and leaving a runway between them, and upright straps connecting the side bar and guide bar, the front strap being plain and straight, the intermediate strap having an outstanding loop opposite to and of greater vertical dimension than said runway, and the rearmost strap being spaced from the outer faces of said bars; of a handle whose body is of strap iron of a size to pass inside the rearmost strap and loosely through said loop, and a rivet through the front end of the body with its shank sliding in said runway and its inner end having an enlarged head adapted to contact with the leg when the handle is drawn out and canted upward.

In testimony whereof I have hereunto set my hand in presence of two subscribing witnesses.

FRANK MURRAY GUNN.

Witnesses:
GEO. T. TUPMAN,
WM. B. BRAIZLEY.

Copies of this patent may be obtained for five cents each, by addressing the "Commissioner of Patents, Washington, D. C."